United States Patent
Nilsson et al.

(10) Patent No.: US 8,903,008 B2
(45) Date of Patent: Dec. 2, 2014

(54) METHODS AND ARRANGEMENTS FOR WIDEBAND PRECODING

(75) Inventors: Andreas Nilsson, Goteborg (SE); Fredrik Athley, Kullavik (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/995,116

(22) PCT Filed: Dec. 15, 2010

(86) PCT No.: PCT/EP2010/069826
§ 371 (c)(1),
(2), (4) Date: Jun. 17, 2013

(87) PCT Pub. No.: WO2012/079632
PCT Pub. Date: Jun. 21, 2012

(65) Prior Publication Data
US 2013/0272442 A1 Oct. 17, 2013

(51) Int. Cl.
*H04B 7/02* (2006.01)
*H04B 7/08* (2006.01)
*H04B 7/04* (2006.01)
*H04L 25/03* (2006.01)
*H04B 7/06* (2006.01)

(52) U.S. Cl.
CPC .............. *H04B 7/0456* (2013.01); *H04B 7/086* (2013.01); *H04B 7/0632* (2013.01); *H04L 25/03828* (2013.01); *H04B 7/0617* (2013.01)
USPC ........... 375/267; 375/260; 375/259; 375/295; 375/316; 375/299

(58) Field of Classification Search
CPC .. H04B 7/0617; H04B 7/0639; H04B 7/0671; H04B 7/0456; H04B 7/0632; H04B 7/086; H04L 25/03828
USPC ................. 375/267, 260, 259, 295, 316, 299
See application file for complete search history.

(56) References Cited

U.S. PATENT DOCUMENTS

| 8,396,143 | B2 * | 3/2013 | Kim et al. ................. 375/260 |
| 2008/0095260 | A1 * | 4/2008 | Vaidyanathan ............ 375/267 |
| 2009/0247175 | A1 * | 10/2009 | van Rensburg et al. ...... 455/450 |
| 2010/0061482 | A1 * | 3/2010 | Lee et al. ................. 375/296 |
| 2011/0243272 | A1 * | 10/2011 | Hammarwall et al. ....... 375/296 |

OTHER PUBLICATIONS

NTT DOCOMO: "UL MIMO Transmission Schemes in LTE-Advanced" 3GPP Draft; R1-090902 UL MIMO Scheme, 3rd Generation Partnership Project (3GPP), Mobile Competence Centre, 2009, XP050318745, 7 pages.

* cited by examiner

*Primary Examiner* — Kenneth Lam
(74) *Attorney, Agent, or Firm* — Rothwell, Figg, Ernst & Manbeck, P.C.

(57) ABSTRACT

The present invention relates to a network node and a mobile node, and to related methods for wideband precoding. The methods comprise determining a phase compensation vector which is frequency dependent for the at least one predefined precoding weight vector in a precoding codebook for multi-antenna transmission. The methods further comprise determining a second precoding weight vector which is phase compensated by multiplying the at least one predefined precoding weight vector by the phase compensation vector.

19 Claims, 8 Drawing Sheets

METHODS AND ARRANGEMENTS FOR WIDEBAND PRECODING

CROSS REFERENCE TO RELATED APPLICATION(S)

This application is a 35 U.S.C. §371 National Phase Entry Application from PCT/EP2010/069826, filed Dec. 15, 2010, designating the United States, the disclosure of which is incorporated herein in its entirety by reference.

TECHNICAL FIELD

The present invention generally relates to wireless communications technology and more particularly to improvements related to wideband precoding in a wireless communications system.

BACKGROUND

It is well-known that the use of multiple antennas at the transmitter and/or the receiver can significantly boost the performance of a wireless system. Such antenna configurations have the potential of both improving data rates and increasing coverage.

Precoding is a multi-antenna technique for improving the performance of a multi-antenna system by transforming the information carrying transmit vector so that it better fits the channel conditions. Thus, precoding is a kind of beamforming that supports multi-layer transmission in Multiple-Input Multiple-Output (MIMO) radio systems and has been included in the standardization of Long Term Evolution (LTE).

In precoding, each of the multiple streams are emitted from each of the transmit antennas at the base station with independent and appropriate weighting per antenna element such that the throughput is maximized between the base station and the user equipment (UE). The benefits of the weighting are to increase the signal gain and/or to reduce interference from other users of the communication system. The precoding weights are calculated at the UE and then the UE informs the base station which precoding weights that should be used. Usually, only a limited number of predefined precoding weights are used, called a codebook. The codebook is known both at the base station and the UE, so when the UE informs the base station which precoding weights that should be used, the UE only needs to send a number corresponding to the place that the precoding weights have in the codebook. This number is usually called Precoding Matrix Indicator (PMI).

The more antennas that are used at the base station, the more precoding weights are needed in the codebook.

Precoding can be frequency selective or wideband. In frequency selective precoding different PMIs can be chosen to be applied in different frequency subbands. With wideband precoding the same PMI is used over the entire frequency band.

In order to meet future demands of higher bit rates a wider system bandwidth will be necessary. In LTE-Advanced, wider bandwidth will be achieved by aggregating component carriers either contiguously or non-contiguously. For contiguous carrier aggregation, consecutive spectrum is aggregated, while discontinuous bands are accumulated for non-contiguous carrier aggregation.

If the relative bandwidth is large or aggregated spectrum is used, a beam corresponding to a certain PMI will point in different directions for different frequencies within the band. Since the same PMI must be used over the entire frequency band within wideband precoding, this will lead to that a beam that points in a direction to the UE for one frequency will point away from the UE for other frequencies. FIG. 1 is a diagram which illustrates radiation patterns of an example of prior art wideband precoding over two subbands, the first located at 700 MHz and the second located at 1000 MHz. The first beam 110 is the radiation pattern for the subband located at 700 MHz and the second beam 120 is the radiation pattern for the subband located at 1000 MHz. As can be seen in FIG. 1, the first radiation pattern points at the mobile node 100 but the second radiation pattern have almost a null in the direction of the mobile node 100 which will lead to reduced Signal-to-Noise Ratio (SNR) for the second subband. Particularly, in a line-of-sight scenario or in a channel with small angular spread this will lead to a gain drop at these frequencies and degraded performance.

SUMMARY

It is therefore an object to address some of the problems and disadvantages outlined above and to provide improved methods and arrangements for wideband precoding.

The above stated object is achieved by means of methods and arrangements according to the independent claims, and by the embodiments according to the dependent claims.

In accordance with an embodiment, a method in a network node for wideband precoding is provided. The network node is comprised in a wireless communications system and configured for precoding signals prior to transmission by means of a first precoding codebook for multi-antenna transmission to a mobile node. Furthermore, the first precoding codebook comprises at least one predefined precoding weight vector. The method comprises determining a phase compensation vector which is frequency dependent for the at least one predefined precoding weight vector. Moreover, the method comprises determining a second precoding weight vector which is phase compensated by multiplying the at least one predefined precoding weight vector by the phase compensation vector.

In accordance with a second embodiment, a network node for wideband precoding is provided. The network node is arranged to be comprised in a wireless communications system and configured for precoding signals prior to transmission by means of a precoding codebook for multi-antenna transmission to a mobile node. The precoding codebook comprises at least one predefined precoding weight vector. Furthermore, the network node comprises a processing unit adapted to determine a phase compensation vector which is frequency dependent for the at least one predefined precoding weight vector. The processing unit is also adapted to determine at least a second precoding weight vector which is phase compensated by multiplying the at least one predefined precoding weight vector by the phase compensation vector.

In accordance with a third embodiment, a method in a mobile node for wideband precoding is provided. The mobile node is adapted to be comprised in a wireless communications system and configured for precoding signals by means of a first precoding codebook for multi-antenna transmission from the mobile node to a network node. The network node is comprised in the wireless communications system. Moreover, the first precoding codebook comprises at least one predefined precoding weight vector. The method comprises determining a phase compensation vector which is frequency dependent for the at least one predefined precoding weight vector. Furthermore, the method comprises determining a second precoding weight vector which is phase compensated by multiplying the at least one predefined precoding weight vector by the phase compensation vector.

In accordance with a fourth embodiment, a mobile node for wideband precoding is provided. The mobile node is arranged to be comprised in a wireless communications system and configured for precoding signals by means of a precoding codebook for multi-antenna transmission from the mobile node to a network node. The network node is comprised in the wireless communications system. Moreover, the precoding codebook comprises at least one predefined precoding weight vector. The mobile node comprises a processing unit adapted to determine a phase compensation vector which is frequency dependent for the at least one predefined precoding weight vector, and adapted further to determine at least a second precoding weight vector which is phase compensated by multiplying the at least one predefined precoding weight vector by the phase compensation vector.

An advantage of embodiments of the present invention is that they improve the performance of wideband precoding for aggregated spectrum or frequency bands with large relative bandwidths.

Another advantage of embodiments of the present invention is that they align the precoding beams for different sub-bands i.e. the beams will point in the same direction.

Yet another advantage of embodiments of the present invention is that they will increase the probability for a high SNR at the mobile node over the whole frequency band used in the wideband wireless communications system.

Further advantages and features of embodiments of the present invention will become apparent when reading the following detailed description in conjunction with the drawings.

BRIEF DESCRIPTION OF THE DRAWINGS

For a better understanding, reference is made to the following drawings and preferred embodiments of the invention.

DETAILED DESCRIPTION

Figure 1:
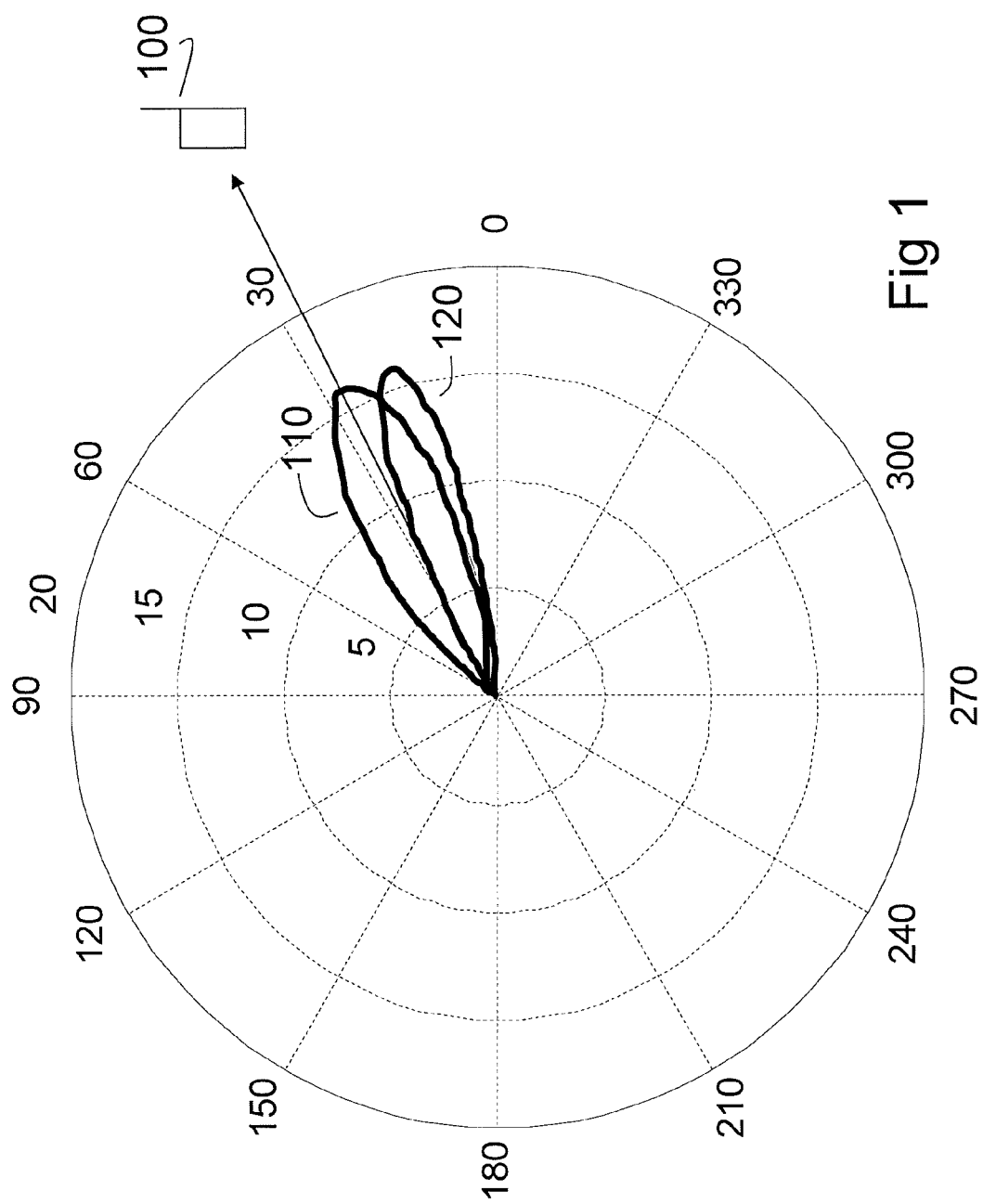
FIG. 1 is a diagram which illustrates radiation patterns of an example of prior art wideband precoding over two sub-bands.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Throughout this application the term "network node" is used to refer to a node which may be a base station, a repeater or a relay. The term "mobile node" is used to refer to a node which may be a mobile terminal or some other type of mobile user equipment (UE).

Figure 2:
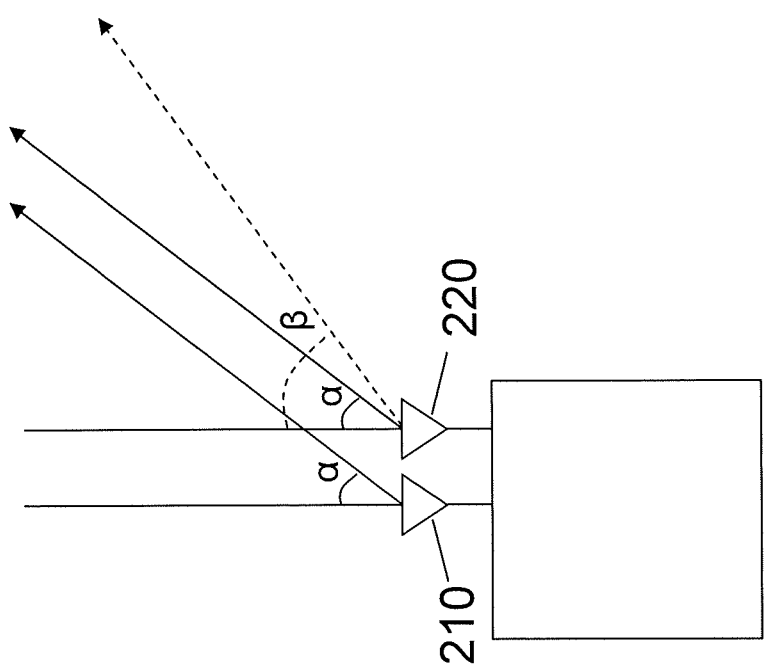
FIG. 2 illustrates that a phase difference is introduced on a signal when two antenna elements is transmitting the same signal.

FIG. 2 illustrates two antenna elements 210 and 220. The same signal is transmitted from the two antenna elements. However, when transmitting the signal from one of the antenna elements 220 a phase difference $\phi_0$ is introduced on the signal in order to steer the beam in the same direction $\alpha$ as the signal transmitted from the other antenna element 210. The phase difference $\phi_0$ is frequency dependent, which means that the antenna elements 210, 220 will steer a beam in a different direction $\beta$ when the signal is transmitted on a different frequency.

Embodiments provide solutions for wideband precoding which aligns the beams over the available bandwidth so that a beam corresponding to a certain precoding weight vector in the codebook will point in the same direction independent of the transmitting frequency. This is achieved by determining a phase compensation vector which is frequency dependent for the predefined precoding weight vector and thereupon determining a precoding weight vector which is phase compensated by multiplying the predefined precoding weight vector by the determined phase compensation vector.

Embodiments of the present invention may be used for wideband precoding in a wireless communications system. A network node, e.g. a base station, a repeater or a relay, communicates with a mobile node such as a mobile node, e.g. a user equipment (UE). Both the base station and the UE may be configured for precoding signals by means of a precoding codebook for multi-antenna transmission. However, it is not necessary to use precoding for both downlink and uplink transmissions in the same system. For example, in some standardized communications systems only the base station uses precoding. However, the UE must know the codebook in order to calculate the best precoding vector that the base station should use. In one embodiment the base station and the UE may be configured with the same standardized codebook. The precoding codebook comprises a plurality of precoding weights. Moreover, as previously mentioned the more antenna elements that are used for transmission, the more precoding weights are needed in the codebook.

The predefined weights in the codebook are usually expressed as weight vectors. Ignoring possible amplitude normalization a weight vector in the original codebook can be expressed as $$w = [\exp(j\phi_1) \ldots \exp(j\phi_K)] \quad (1)$$

where $\phi_K$ is the phase angle of the complex weight in the original precoding codebook of the k-th array antenna element.

For a linear array antenna the phase angles are given by $$\phi_k = \frac{2\pi f_0 d_k}{c} \sin\theta_0, \qquad (2)$$

where $d_k$ is the distance of the k-th array antenna element from a reference point, $f_0$ is a reference frequency and c is the speed of light. $\theta_0$ is the pointing direction of the beam.

The weight vector will at the reference frequency $f_0$ thus produce a beam with a pointing direction $\theta_0$ given by $$\theta_0 = \arcsin\left(\frac{c\phi_k}{2\pi f_0 d_k}\right) \qquad (3)$$

The inventors have realized that to obtain the same pointing direction at another frequency $f=f_1$ within the bandwidth another weight vector may be determined. Thus $$\tilde{w} = [exp(j\tilde{\phi}_1) \ldots exp(j\tilde{\phi}_K)], \qquad (4)$$

with pointing direction $$\tilde{\theta}_0 = \arcsin\left(\frac{c\tilde{\phi}_k}{2\pi f_1 d_k}\right) \qquad (5)$$

Furthermore, in order to make the weight vector produce beams in the same pointing direction independent of frequency this is given by $$\tilde{\theta}_0 = \theta_0 \qquad (6)$$

This is achieved by letting $$\tilde{\phi}_k = \frac{f_1}{f_0}\phi_k \qquad (7)$$

The modified weight vector is thus given by (4) with the phase angles of the complex weight obtained from (7). The modified weight vector can also be obtained by multiplying the original weight vector with a phase compensation factor $\overline{w}_k$ according to $$\tilde{w}_k = \overline{w}_k w_k, \qquad (8)$$

with $$\overline{w}_k = \exp\left(j\left(\frac{f_1}{f_0} - 1\right)\phi_k\right) \qquad (9)$$

A modified codebook which is frequency compensated is then obtained by multiplying the weight vectors in the original codebook by the compensation factors given in expression (9).

A frequency granularity of the compensation needs to be determined for the wideband wireless communications system at hand. For example, in LTE compensation per subcarrier or physical resource block may not be necessary since the relative frequency separation between such adjacent elements is very small. As a general guideline, a relative frequency difference of more than approximately 10% may be sufficient to motivate a frequency compensation of the codebook. However, it should be pointed out that the described embodiments may be relevant for an even lower relative frequency difference.

Figure 3:
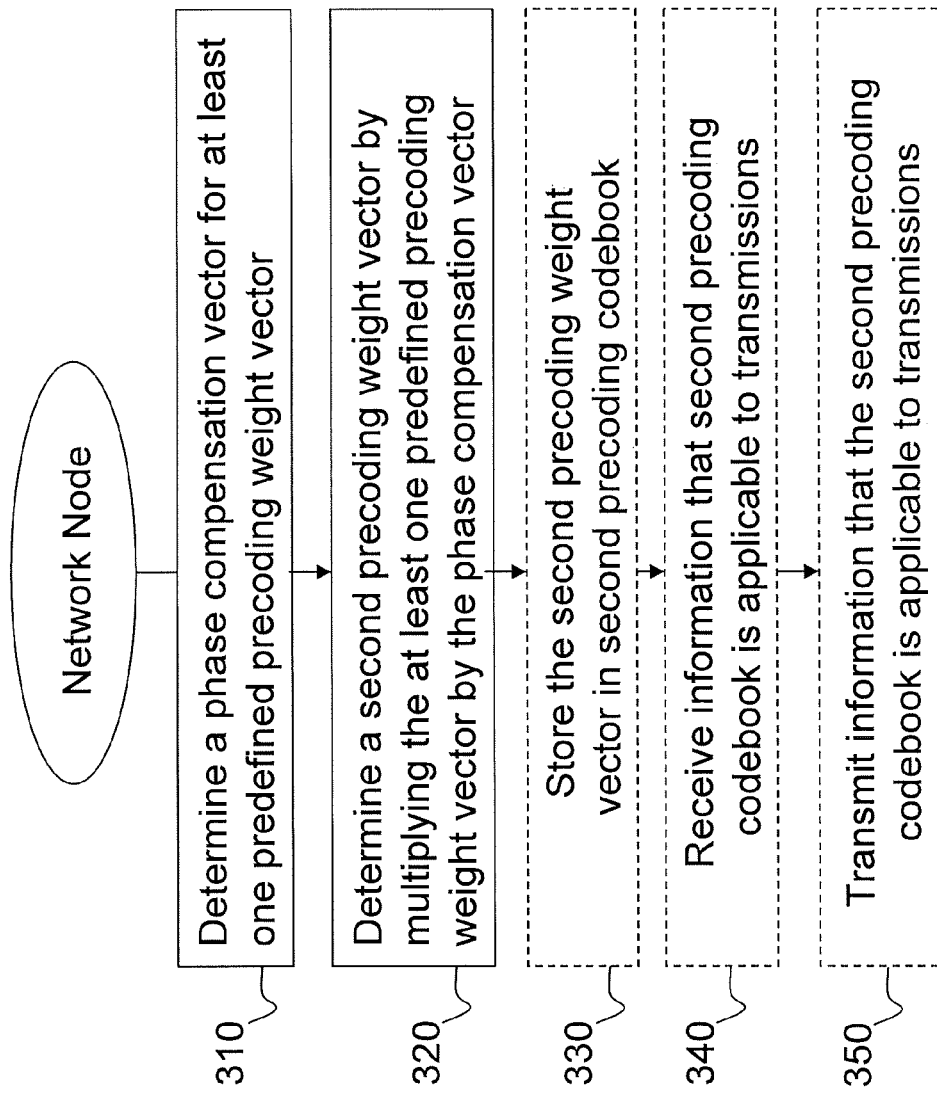
FIG. 3 shows a flowchart of a method in a network node according to embodiments of the present invention.

Turning now to FIG. 3 showing a flowchart of a method in a network node according to embodiments of the present invention. The network node is comprised in a wireless communications system and configured for precoding signals prior to transmission by means of a first precoding codebook for multi-antenna transmission to a mobile node. The wireless communications system may be a system wherein a wider system bandwidth will be necessary. For example, the wider bandwidth may be achieved by aggregating component carriers either contiguously or non-contiguously.

Step 310. The network node determines a phase compensation vector which is frequency dependent for at least one predefined precoding weight vector. The predefined precoding weight vector is comprised in a first precoding codebook which is known both in the network node and the mobile node. It should also be pointed out that the codebook may comprise a plurality of precoding weight vectors as previously mentioned.

In one embodiment a reference frequency $f_0$ is predetermined in the wireless communications system. The reference frequency may be any frequency in the available bandwidth used by the wireless communications system. For example, it may be the lowest or the highest frequency in the available bandwidth. The network node may then determine the phase compensation vector $\tilde{w}$ by calculating the phase compensation vector based on a fraction between a secondary frequency $f_1$ and the reference frequency $f_0$ in accordance with the previously mentioned expression (9)

$$\overline{w}_k = \exp\left(j\left(\frac{f_1}{f_0} - 1\right)\phi_k\right)$$

The determining of the phase compensation vector is thus based on the phase angles of the complex weights $\phi_{k=1} \ldots \phi_k$ in the first precoding codebook.

Step 320. The network node then determines a second precoding weight vector which is phase compensated by multiplying the at least one predefined precoding weight vector by the determined phase compensation vector. It should be mentioned that multiplication of vectors can be defined in several different ways. However, in one embodiment of the present invention an element-wise multiplication is utilized when the network node determines the second precoding weight vector.

Step 330. In one embodiment of the present invention an additional step of storing the determined second precoding weight vector in a second precoding codebook is performed. Thus, the second precoding codebook is a phase compensated codebook which may be used in the wireless communications system in order to align the precoding beams for different subbands used in the system. The phase compensation may be applied at a number of different frequencies $f_1, \ldots, f_k$. This implies that there are several codebooks, the original first precoding codebook and one for each frequency that shall be phase compensated. Thus, the network node could use an original codebook $C_0$ for reference frequency $f_0$, and a number of codebooks $C_1, \ldots, C_k$ for frequencies $f_1, \ldots, f_k$ for wideband precoding.

Step 340. In another embodiment of the present invention the network node receives information from the mobile node that the phase compensated codebook is applicable for precoding signals prior to transmissions on the secondary frequency to the mobile node. Thus, the mobile node informs the network node which of the different codebooks $C_1, \ldots, C_k$ that is to be used in different parts of the frequency band.

Step 350. In another embodiment of the present invention the network node may respond to the received information that the phase compensated codebook should be applied on transmissions on the secondary frequency by transmitting information to the mobile node that the phase compensated codebook is applicable to transmissions. Thus, the network node then informs the mobile node which of the different codebooks $C_1, \ldots, C_k$ that is used in different parts of the frequency band.

Figure 4:
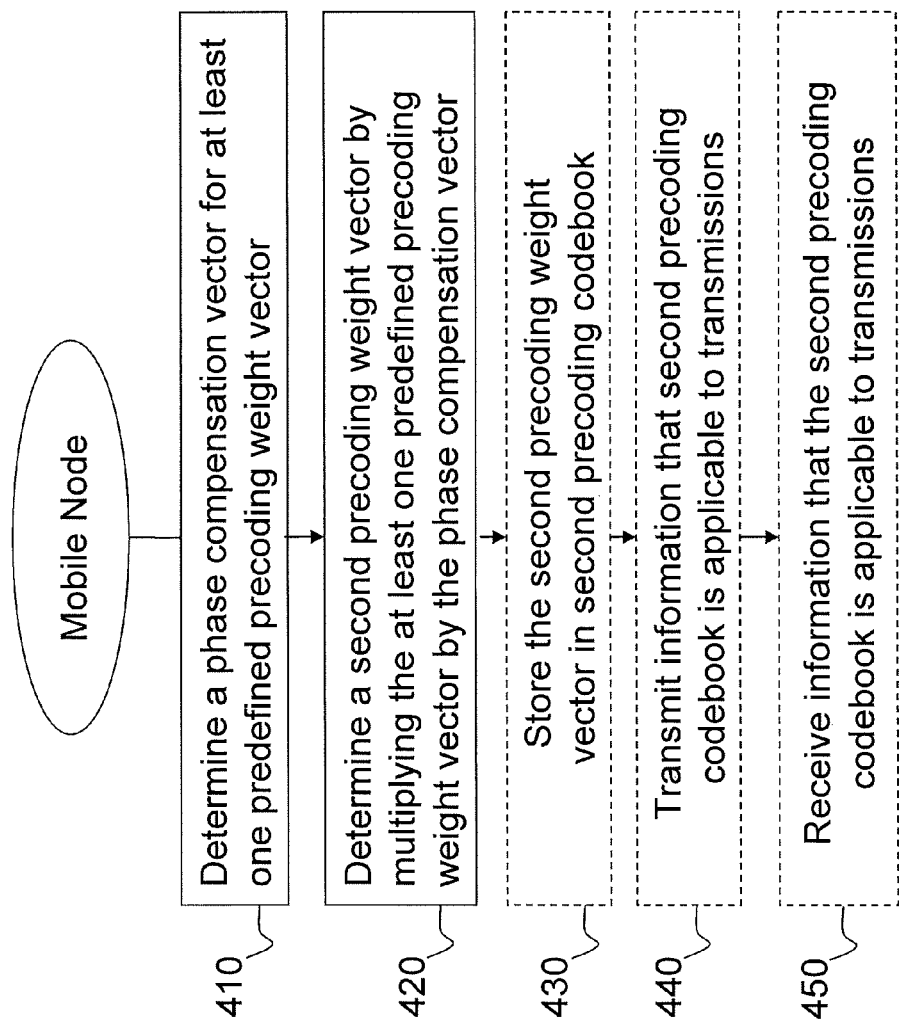
FIG. 4 shows a flowchart of a method in a mobile node according to embodiments of the present invention.

Turning now to FIG. 4 showing a flowchart of a method in a mobile node according to embodiments of the present invention. The mobile node is comprised in a wireless communications system and configured for precoding signals by means of a first precoding codebook for multi-antenna transmission from a mobile node to a network node comprised in the wireless communications system. Also in these embodiments the wireless communications system may be a system wherein a wider system bandwidth will be necessary. For example, the wider bandwidth may be achieved by aggregating component carriers either contiguously or non-contiguously.

Step 410. The mobile node determines a phase compensation vector which is frequency dependent for at least one predefined precoding weight vector. The predefined precoding weight vector is comprised in a first precoding codebook which is known both in the mobile node as well as in the network node. It should also be pointed out that the codebook may comprise a plurality of precoding weight vectors as previously mentioned.

In one embodiment a reference frequency $f_0$ is predetermined in the wireless communications system. The reference frequency may be any frequency in the available bandwidth used by the wireless communications system. For example, it may be the lowest or the highest frequency in the available bandwidth. The mobile node may then determine the phase compensation vector $\tilde{w}$ by calculating the phase compensation vector based on a fraction between a secondary frequency $f_1$ and the reference frequency $f_0$ in accordance with the previously mentioned expression (9)

$$\tilde{w}_k = \exp\left(j\left(\frac{f_1}{f_0} - 1\right)\phi_k\right)$$

The determining of the phase compensation vector is thus based on the phase angles of the complex weights $\phi_{k=1} \ldots \phi_k$ in the first precoding codebook.

Step 420. The mobile node then determines a second precoding weight vector which is phase compensated by multiplying the at least one predefined precoding weight vector by the determined phase compensation vector. It should be mentioned that multiplication of vectors can be defined in several different ways. However, in one embodiment of the present invention an element-wise multiplication is utilized when the mobile node determines the second precoding weight vector.

Step 430. In one embodiment of the present invention an additional step of storing the determined second precoding weight vector in a second precoding codebook is performed. Thus, the second precoding codebook is a phase compensated codebook which may be used in the wireless communications system in order to align the precoding beams for different subbands used in the system. The phase compensation may be applied at a number of different frequencies $f_1, \ldots, f_k$. This implies that there are several codebooks, the original first precoding codebook and one for each frequency that shall be phase compensated. Thus, the mobile node could use an original codebook $C_0$ for reference frequency $f_0$, and a number of codebooks $C_1, \ldots, C_k$ for frequencies $f_1, \ldots, f_k$ for wideband precoding.

Step 440. In another embodiment of the present invention the mobile node may transmit information to the network node that the phase compensated codebook is applicable to transmissions on the secondary frequency to the mobile node. Thus, the mobile node informs the network node which of the different codebooks $C_1, \ldots, C_k$ that is to be used in different parts of the frequency band.

Step 450. In another embodiment of the present invention the mobile node may receive information from the network node that the phase compensated codebook is applied to transmissions on the secondary frequency. Thus, the network node informs the network node which of the different codebooks $C_1, \ldots, C_k$ that is used in different parts of the frequency band.

In one embodiment the first original predefined codebook comprises one or a plurality of predefined precoding matrices. Additionally, each precoding matrix may include one or a plurality of precoding weight vectors. The entire first original codebook, i.e. all the precoding weight vectors in all the matrices, may be phase compensated. Then the above described methods may be performed for the plurality of the predefined precoding weight vectors.

It should be pointed out that the previously described embodiments could be applicable in a wireless communications system wherein Coordinated Multi-Point (CoMP) transmission is used, e.g. LTE. the embodiments could also be applicable in systems wherein Multi-user Multiple-Input Multiple-Output (MU-MIMO) is used.

Figure 5:
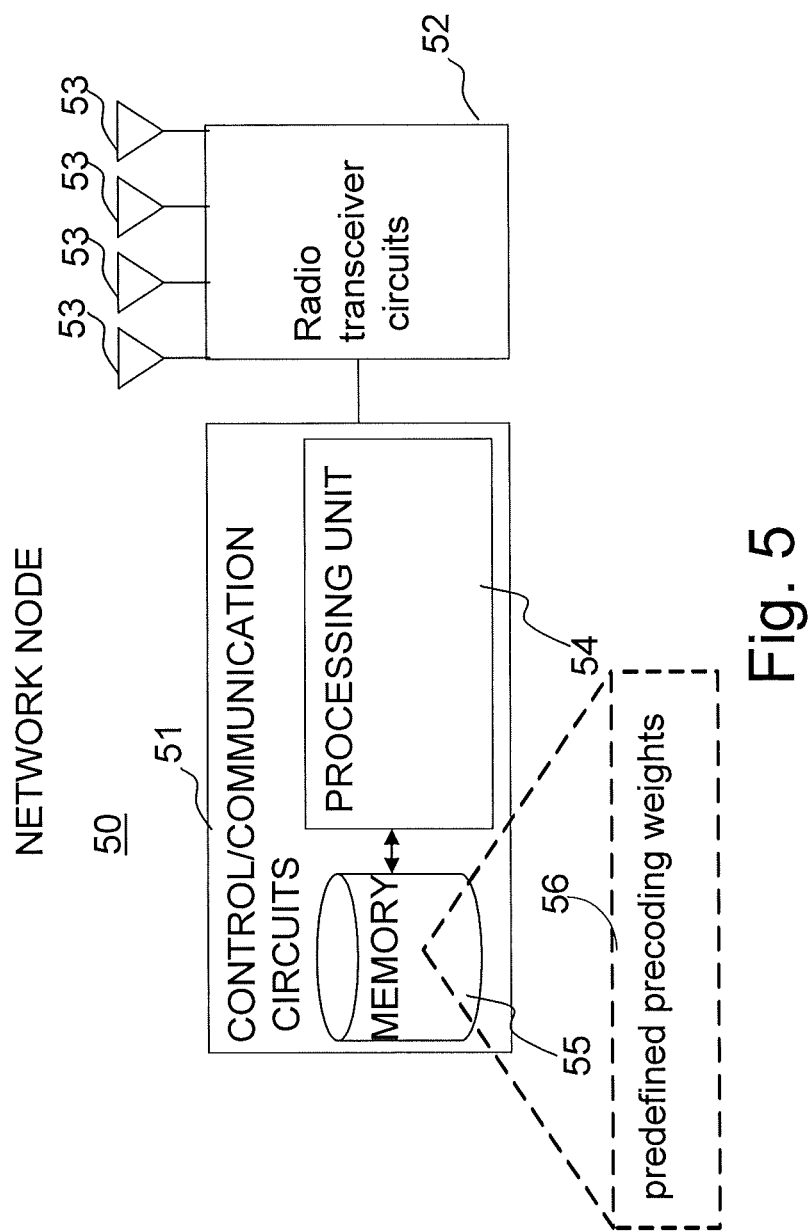
FIG. 5 is a schematic block diagram illustrating a network node according to an embodiment of the present invention.

FIG. 5 is a schematic block diagram illustrating a network node 50 according to an embodiment of the present invention. The network node includes control/communication circuits 51, radio transceiver circuits 52 and a plurality of antenna elements 53. The processing unit 54 is adapted to determine a phase compensation vector which is frequency dependent for the at least one predefined precoding weight vector, and adapted to determine at least a second precoding weight vector which is phase compensated by multiplying the at least one predefined precoding weight vector by the phase compensation vector as described above. Processing unit/circuits 54 is further adapted to store the above mentioned phase compensated codebook in a memory unit/circuits 55. As will be apparent to a person skilled in the art different components of the network node 50 may be realized by means of software, hardware, firmware or combinations thereof. The memory unit 55 is illustrated in FIG. 5 as an integral part of the control/communication circuits but it is also possible that the memory unit 55 is located in e.g. a centralized network node. The relocated memory unit would then be part of a distributed network node. It will furthermore be apparent to the person skilled in the art that although parts of the network node 50 are illustrated as separate units or circuits in FIG. 5 it is also possible for several parts to be physically integrated.

Figure 6:
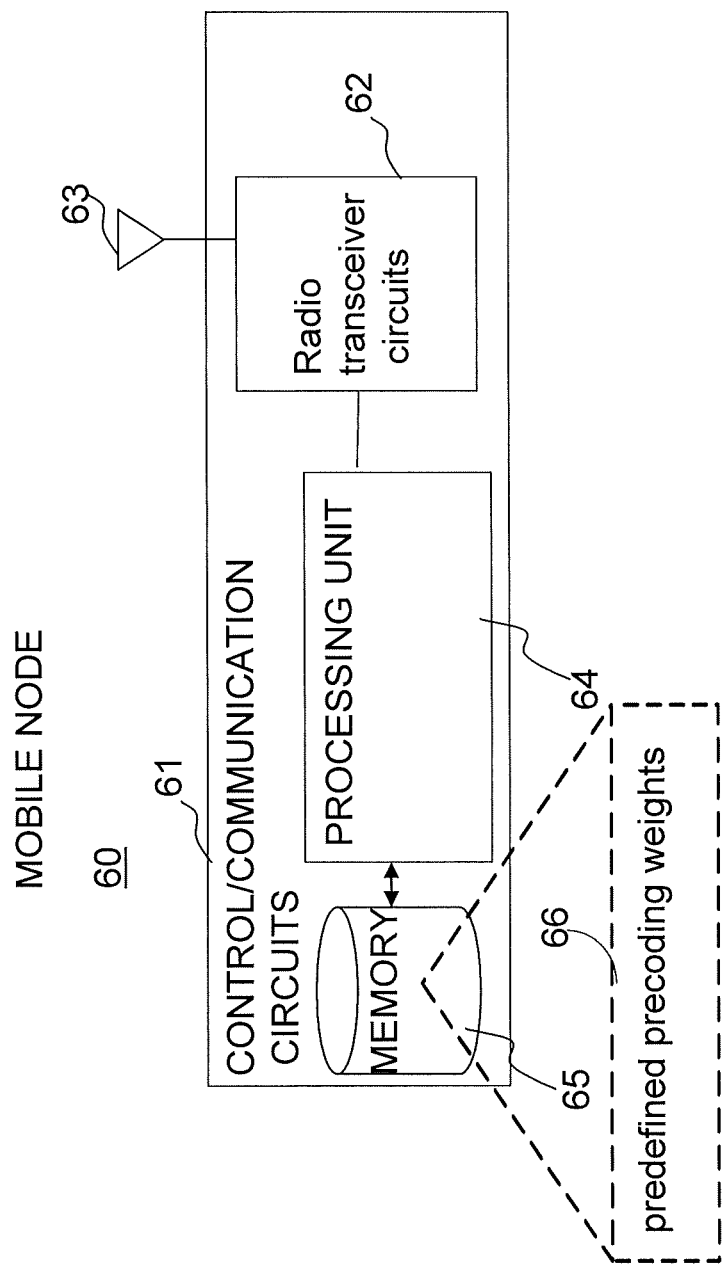
FIG. 6 is a schematic block diagram illustrating a mobile node according to an embodiment of the present invention.

FIG. 6 is a schematic block diagram illustrating a mobile node 50 according to embodiments of the present invention. The mobile node includes control/communication circuits 61, radio transceiver circuits 62 and at least one antenna element 63. In one exemplary embodiment, when the wideband precoding is used for uplink precoding the mobile node comprises and a plurality of antenna elements 63. The processing unit 64 is adapted to determine a phase compensation vector which is frequency dependent for the at least one predefined precoding weight vector, and adapted to determine at least a second precoding weight vector which is phase compensated by multiplying the at least one predefined precoding weight vector by the phase compensation vector as described above. Processing unit/circuits 64 is further adapted to store the above mentioned phase compensated codebook in a memory unit/circuits 65. As will be apparent to a person skilled in the art different components of the mobile node 60 may be realized by means of software, hardware, firmware or combinations thereof. It will furthermore be apparent to the person skilled in the art that although parts of the mobile node 60 are illustrated as separate units or circuits in FIG. 6 it is also possible for several parts to be physically integrated.

Figure 7:
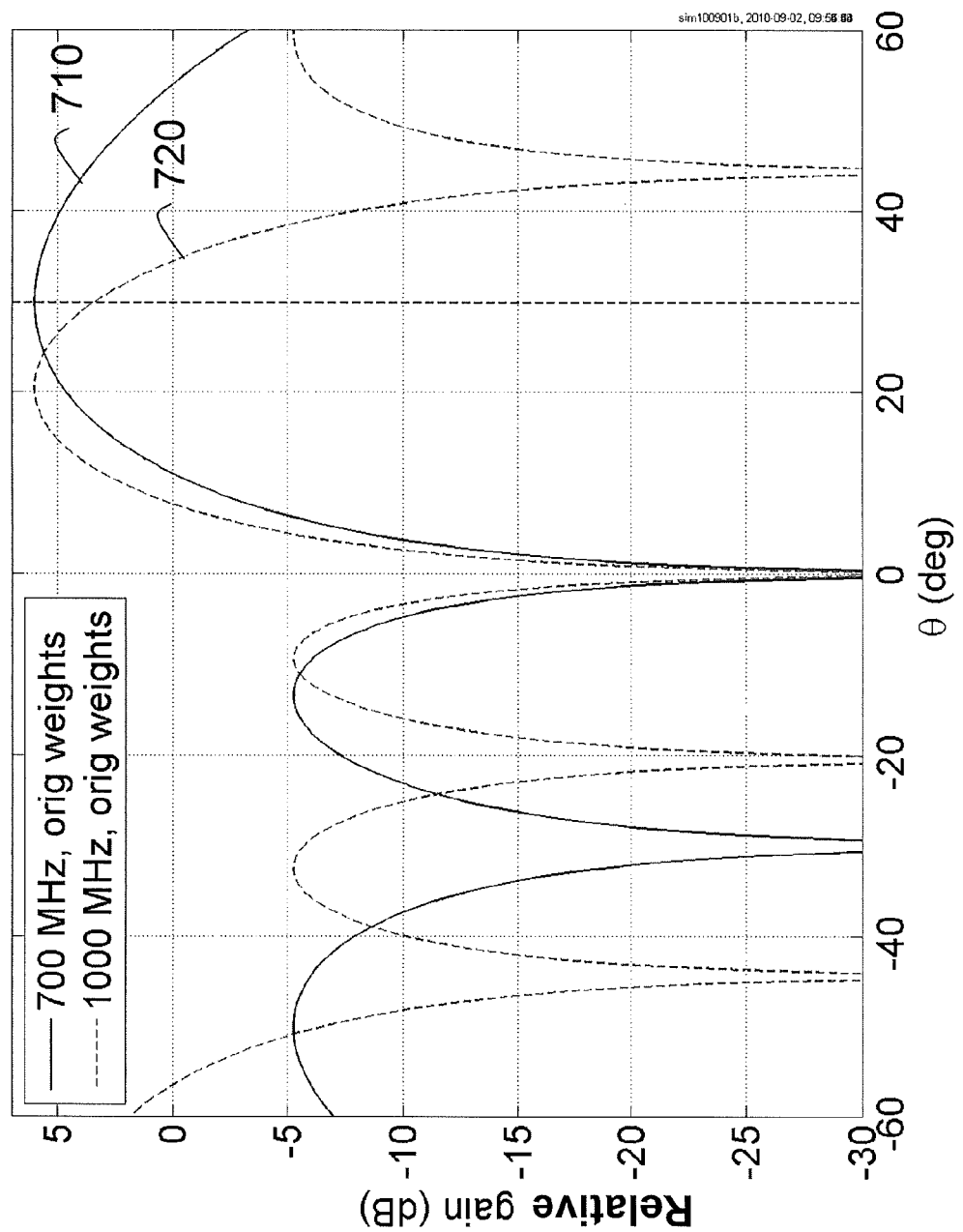
FIG. 7 shows a diagram illustrating the beam patterns for a linear array antenna using the original codebook.
Figure 8:
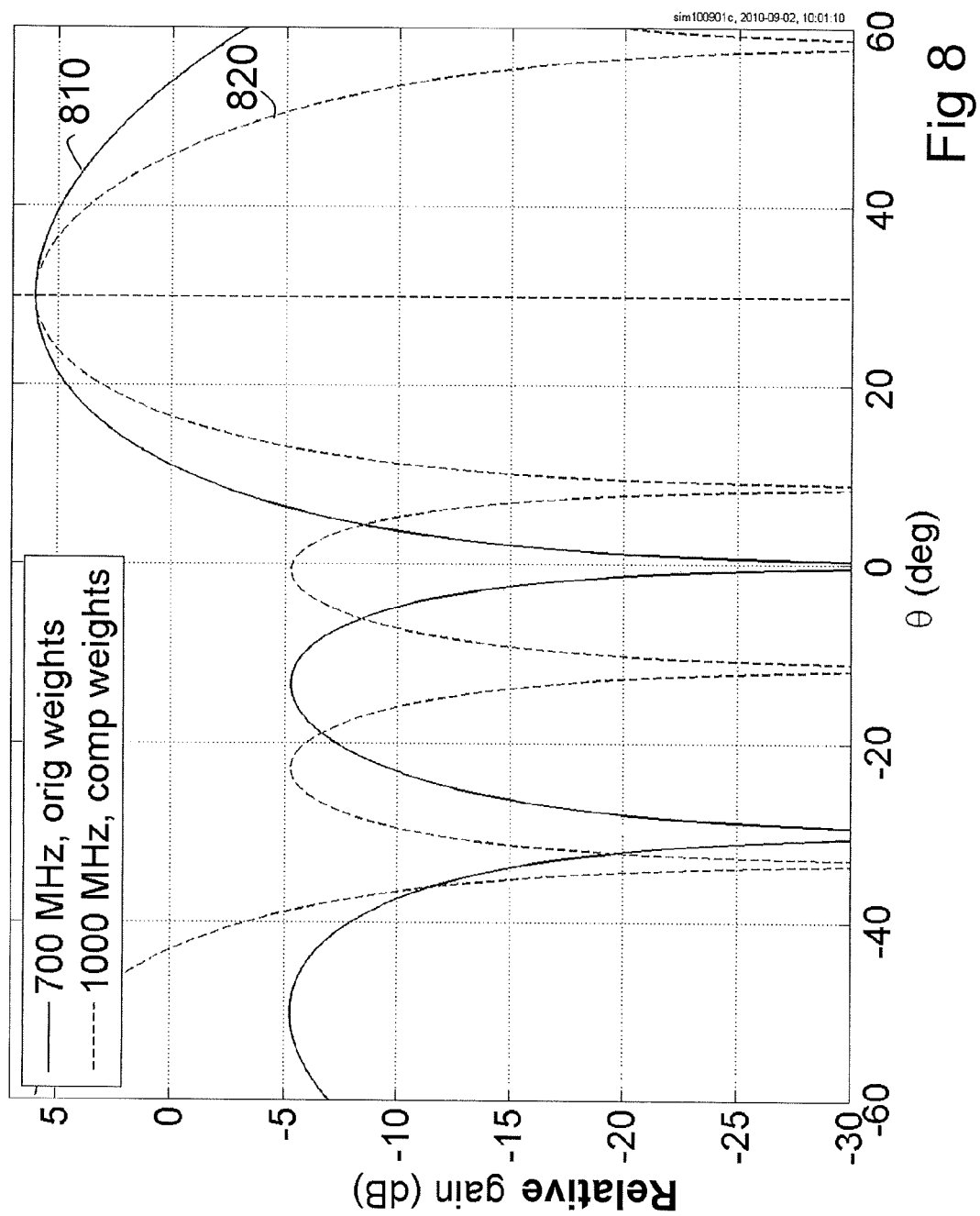
FIG. 8 shows a diagram illustrating the beam patterns for a linear array antenna using the original codebook and the phase compensated codebook.

FIG. 7 shows a diagram illustrating the beam patterns for a 4-element uniform linear array antenna with isotropic elements at two different frequencies for a particular weight vector in a 3GPP LTE codebook. The first beam pattern 710 is generated at a frequency of 700 MHz and the second beam pattern 720 is generated at a frequency of 1000 MHz. The element separation is half a wavelength at 700 MHz. At the first frequency the beam pointing direction θ is approximately 30° while it is 20° at the second frequency, which could be seen in FIG. 7. Turning now to FIG. 8 showing a diagram illustrating the beam patterns for the same antenna the same frequencies. The first beam pattern 810 is generated at the frequency of 700 MHz using the predefined weight vector in the original codebook. However, the second beam pattern 820 is generated at the second frequency of 1000 MHz using the phase compensated precoding weight vector in the phase compensated codebook in accordance with the previously described embodiments. At the first frequency the beam pointing direction θ is still approximately 30° while at the second frequency the pointing direction is now approximately 30°, which could be seen in FIG. 8. Hence, the beams are aligned in order to point in the same direction at the two different frequencies.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for wideband precoding of signals in a wireless communications system using a first precoding codebook for multi-antenna transmission, the first precoding codebook comprising at least one predefined precoding weight vector, the method comprising:
   determining a phase compensation vector which is frequency dependent for the at least one predefined precoding weight vector; and
   determining a second precoding weight vector which is phase compensated by multiplying the at least one predefined precoding weight vector by the phase compensation vector, wherein a reference frequency is predetermined, and the determining of the phase compensation vector is performed by calculating the phase compensation vector based on a fraction between a secondary frequency and the reference frequency.

2. The method according to claim 1, wherein the reference frequency is the lowest or the highest frequency in available bandwidth.

3. The method according to claim 1, wherein the determining of the phase compensation vector is performed by calculating the phase compensation vector based on phase angles of the complex weights in the first precoding codebook.

4. The method according to claim 1, comprising:
   storing the second precoding weight vector in a second precoding codebook which is phase compensated.

5. The method according to claim 4, further comprising:
   receiving information that the second precoding codebook is applicable to transmissions on the secondary frequency.

6. The method according to claim 4, further comprising:
   transmitting information that the second precoding codebook is applicable to transmissions on the secondary frequency.

7. The method according to claim 1, wherein the wireless communication system comprises a wideband communication system.

8. A network node for wideband precoding, wherein the network node is arranged to be comprised in a wireless communications system and is configured for precoding signals prior to transmission by using a precoding codebook for multi-antenna transmission to a mobile node, wherein the precoding codebook comprises at least one predefined precoding weight vector, the network node comprising:
   a processing unit adapted to:
      determine a phase compensation vector which is frequency dependent for the at least one predefined precoding weight vector, and
      determine at least a second precoding weight vector which is phase compensated by multiplying the at least one predefined precoding weight vector by the phase compensation vector, wherein a reference frequency is predetermined, and the determining of the phase compensation vector is performed by calculating the phase compensation vector based on a fraction between a secondary frequency and the reference frequency; and
   a memory unit for storing the second precoding weight vector.

9. The network node according to claim 8, wherein the reference frequency is the lowest or the highest frequency in available bandwidth.

10. The network node according to claim 8, wherein the determining of the phase compensation vector is performed by calculating the phase compensation vector based on phase angles of complex weights in the first precoding codebook.

11. The network node according to claim 8, wherein the processing unit is adapted to: store the second precoding weight vector in a memory unit in a second precoding codebook which is phase compensated.

12. The network node according to claim 11, further comprising:
   a receiver for receiving information from the mobile node that the second precoding codebook is applicable to transmissions on the secondary frequency.

13. The network node according to claim 11, further comprising:
   a transmitter for transmitting information to the mobile node that the second precoding codebook is applicable to transmissions on the secondary frequency.

14. A mobile node for wideband precoding, wherein the mobile node is arranged to be comprised in a wireless communications system and is configured for precoding signals by using a precoding codebook for multi-antenna transmission from the mobile node to the network node, the network node being comprised in the wireless communications system, wherein the precoding codebook comprises at least one predefined precoding weight vector, the mobile node comprising:
- a processing unit adapted to;
  - determine a phase compensation vector which is frequency dependent for the at least one predefined precoding weight vector, and
  - determine at least a second precoding weight vector which is phase compensated by multiplying the at least one predefined precoding weight vector by the phase compensation vector, wherein a reference frequency is predetermined, and the determining of the phase compensation vector is performed by calculating the phase compensation vector based on a fraction between a secondary frequency and the reference frequency; and
- a memory unit for storing the second precoding weight vector.

15. The mobile node according to claim 14, wherein the reference frequency is the lowest or the highest frequency in available bandwidth.

16. The mobile node according to claim 14, wherein the determining of the phase compensation vector is performed by calculating the phase compensation vector based on phase angles of complex weights in the first precoding codebook.

17. The mobile node according to claim 14 wherein the processing unit is adapted to: store the second precoding weight vector in a memory unit in a second precoding codebook which is phase compensated.

18. The mobile node according to claim 17, further comprising:
- a receiver receiving information from the network node that the second precoding codebook is applicable to transmissions on the secondary frequency.

19. The mobile node according to, claim 17, further comprising:
- a transmitter for transmitting information to the network node that the second precoding codebook is applicable to transmissions on the secondary frequency.

* * * * *

UNITED STATES PATENT AND TRADEMARK OFFICE
CERTIFICATE OF CORRECTION

PATENT NO. : 8,903,008 B2
APPLICATION NO. : 13/995116
DATED : December 2, 2014
INVENTOR(S) : Nilsson et al.

It is certified that error appears in the above-identified patent and that said Letters Patent is hereby corrected as shown below:

In the claims

In Column 9, Line 67, in Claim 3, delete "of the" and insert -- of --, therefor.

In Column 11, Line 3, in Claim 14, delete "to;" and insert -- to: --, therefor.

In Column 12, Line 14, in Claim 19, delete "according to," and insert -- according to --, therefor.

Signed and Sealed this
Twenty-eighth Day of June, 2016

Michelle K. Lee
*Director of the United States Patent and Trademark Office*